P. DE PAOLINI.
PROCESS AND APPARATUS FOR AUTOGENOUS WELDING.
APPLICATION FILED AUG. 24, 1916.

1,262,653.

Patented Apr. 16, 1918
2 SHEETS—SHEET 1.

P. de Paolini,
Inventor.
By Albert E. Parker
Attorney.

P. DE PAOLINI.
PROCESS AND APPARATUS FOR AUTOGENOUS WELDING.
APPLICATION FILED AUG. 24, 1916.
1,262,653.
Patented Apr. 16, 1918.
2 SHEETS—SHEET 2.
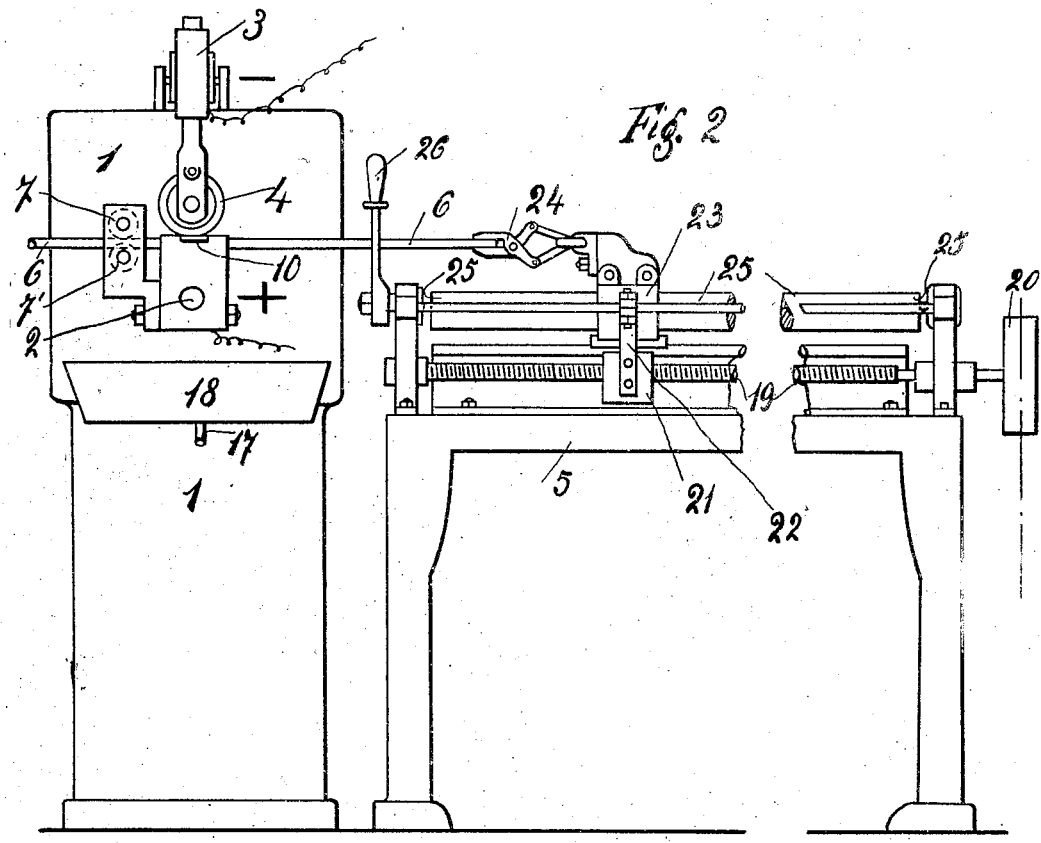
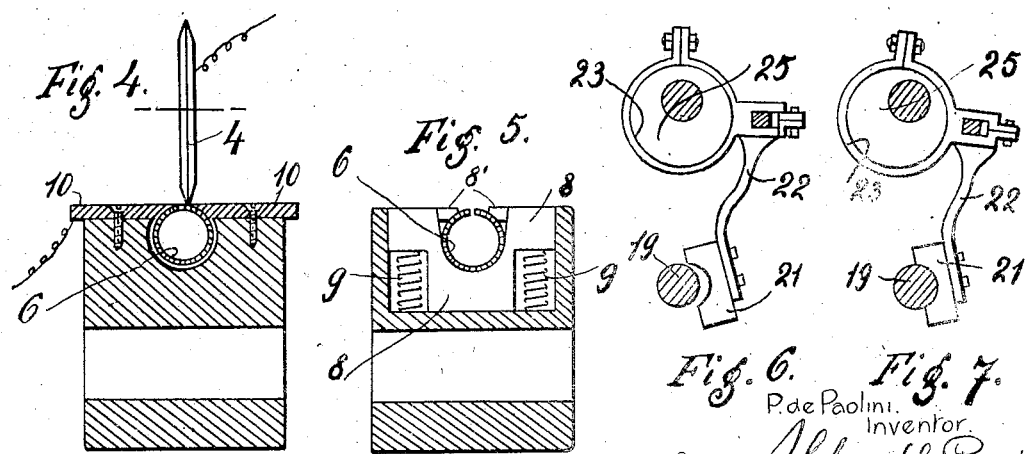

UNITED STATES PATENT OFFICE.

PIETRO DE PAOLINI, OF MILAN, ITALY.

PROCESS AND APPARATUS FOR AUTOGENOUS WELDING.

1,262,653.  Specification of Letters Patent.  Patented Apr. 16, 1918.

Application filed August 24, 1916. Serial No. 116,744.

*To all whom it may concern:*

Be it known that I, PIETRO DE PAOLINI, a subject of the King of Italy, and residing at Milan, Italy, have invented certain new and useful Improvements in a Process and Apparatus for Autogenous Welding, of which the following is a specification.

The present invention relates to a process and apparatus for autogenous welding.

The object of the invention is to effect the said welding by a simpler, more economical and industrially more practical system than any other used heretofore.

The invention essentially consists in the fact that the lips of the tube to be welded are led between and maintained adherent to the opposite edges of two stationary plates preferably of copper (positive pole) and a revolving roller of suitable material (negative pole or vice versa) while the tube is fed on according as the welding progresses, means being provided for cooling, guiding and pulling the tube, and accessorial arrangements, all of which are also claimed in so far as they exhibit the character of novelty either separately or in their application to the object of the invention.

The idea underlying the invention and the way to carry it into effect will be readily understood by reference to the annexed drawing, in which one form of the invention is shown by way of example only, it being understood that the constructional details may be varied from those described and shown without departing from the spirit and scope of the invention.

Figure 1:
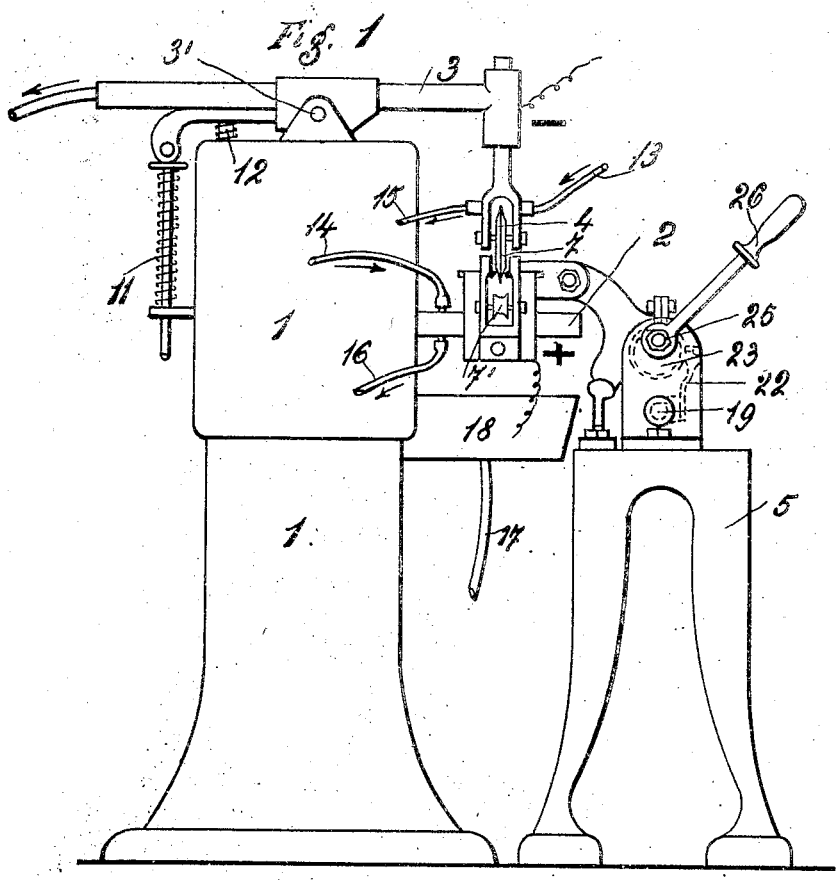

In the drawings Figures 1 and 2 are a front and side elevations respectively of the complete apparatus, the tube to be welded being omitted in Fig. 1 for clearness sake.

Figure 3:
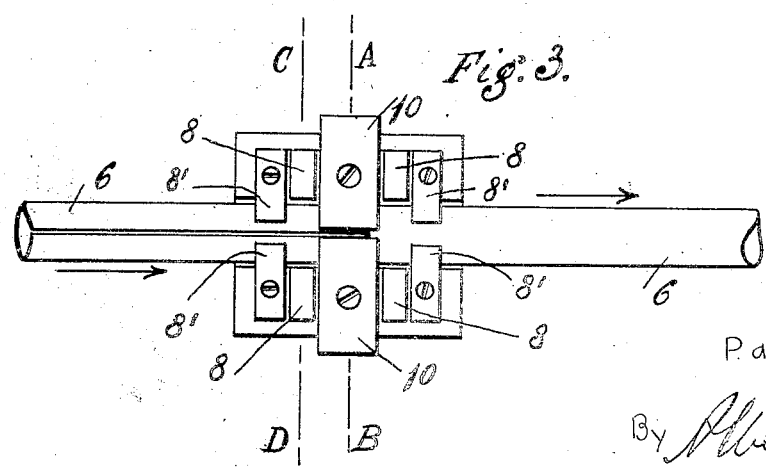

Figs. 3—4—5—6 and 7 are detail figures;

Figs. 4 and 5 are sections on lines A—B and C—D respectively in Fig. 3.

In the various figures the same numerals indicate the same parts.

The frame 1 carries a fixed, resting arm 2 for the tube-guiding parts; above the arm 2 is arranged the rocking arm 3 carrying the roller 4 while a table 5, which on the drawing is shown separate from the frame 1, carries the tube-feeding apparatus. The tube 6 on entering the apparatus with open longitudinal seam is guided by the rollers —7—7'— and firmly held between the fixed plates —8'— (see Figs. 3 and 5) and the blocks 8, the latter being forced upward by the springs 9. Two further fixed plates 10 of copper serve to adjust and guide the revolving roller 4, which is loose on its spindle. The rocking motion of the arm 3 pivoted on 3' and carrying the roller 4 is regulated, as will be readily seen, by the springs 11 and 12. The cooling of the various parts that require cooling is effected by means of water circulation through delivery pipes 13 and 14, discharge pipes 15—16, pipe 17 and tank 18. The device for pulling the tube out of the welding apparatus consists of a screw-threaded spindle 19 (see Figs. 2, 6 and 7) which receives a revolving motion from the pulley 20 but cannot move axially.

The revolving screw-threaded spindle 19 carries a traveling nut 21 (Fig. 2) which, by means of the connecting piece 22, operates a muff 23 carrying the tongs 24.

In resting position the traveling nut 21 does not engage the spindle 19; for starting work the operator lowers the handle 26, thus actuating the eccentric 25 and causing the traveling nut to engage the spindle 19, and keeps the handle 26 in lowered position till the end of the work.

The working of the whole system is obvious and requires no further explanation.

Claims:

1. In a machine for butt welding tube seams, a tube supporting member forming an electrode, an electrode spanning the edges of the seam to form a butt weld, and means for forcing the tube seam edges toward each other during welding.

2. In a machine for butt welding tube seams, a tube supporting member forming an electrode, another electrode spanning the edges of the seam, means for moving the tube to be welded relative to the last named electrode to form a butt weld between the seam edges, and means for forcing the tube seam edges toward each other during welding.

3. In a machine for butt welding tube seams, a tube supporting member forming an electrode, a roller electrode spanning the edges of the seam, to form a butt weld therebetween, means for moving the tube, and means for forcing the tube seam edges toward each other during welding.

4. The method of butt welding tube seams consisting in connecting the split tube with an electrode, forcing the tube seam edges together, and then spanning the tube seam edges with another electrode while the said tube seam edges are being forced toward each other, the heat occurring between the two electrodes serving to effect a butt weld between the tube seam edges.

5. In a tube seam welding machine, a tube support and guide comprising a tube guide having grooved rollers between which the tube is fed, and an electrode block having fixed plates provided with beveled lips on the tube side, and spring supported tube chairs carried in said block and holding the tube toward said beveled lips whereby the tube seam edges are forced toward each other.

6. In a tube seam welding machine, a welding electrode, and another electrode including means resiliently supporting and maintaining the tube in juxtaposition with said welding electrode.

7. In a tube seam welding machine, a tube support and guide, and an electrode block having fixed plates provided with beveled lips on the tube side, and spring supported tube chairs carried in said block and holding the tube toward said beveled lips whereby the tube seam edges are forced toward each other.

8. In a tube seam welding machine, a tube support and guide, fixed throat plates carried by said support, and resiliently mounted tube chairs on either side of said throat plates and maintaining said tube in proper relation with respect to said throat.

In testimony whereof I have signed my name to this specification in the presence of two subscribing witnesses.

PIETRO DE PAOLINI.

Witnesses:
LUIS F. HERNANDEZ,
GIAU GIACOMO GUARMEN.